(12) United States Patent
Mu

(10) Patent No.: US 12,048,015 B2
(45) Date of Patent: Jul. 23, 2024

(54) METHOD AND APPARATUS FOR SETTING TRANSMISSION TIME ADVANCE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 568 days.

(21) Appl. No.: 17/290,242

(22) PCT Filed: Nov. 2, 2018

(86) PCT No.: PCT/CN2018/113718
§ 371 (c)(1),
(2) Date: Apr. 29, 2021

(87) PCT Pub. No.: WO2020/087506
PCT Pub. Date: May 7, 2020

(65) Prior Publication Data
US 2022/0022257 A1 Jan. 20, 2022

(51) Int. Cl.
*H04W 74/0833* (2024.01)
*H04L 5/00* (2006.01)

(52) U.S. Cl.
CPC ....... *H04W 74/0833* (2013.01); *H04L 5/0053* (2013.01)

(58) Field of Classification Search
None
See application file for complete search history.

(56) References Cited

U.S. PATENT DOCUMENTS

2016/0309506 A1* 10/2016 Lim ................. H04W 74/006
2016/0374068 A1* 12/2016 Kim ................. H04W 4/06
(Continued)

FOREIGN PATENT DOCUMENTS

| CN | 102769926 A | 11/2012 |
|---|---|---|
| CN | 102833055 A | 12/2012 |

(Continued)

OTHER PUBLICATIONS

Extended European Search Report in the European Application No. 18938261.7, mailed on Jun. 2, 2022, (6p).

(Continued)

*Primary Examiner* — Minh Trang T Nguyen
(74) *Attorney, Agent, or Firm* — Arch & Lake LLP

(57) ABSTRACT

The present invention provides a method and apparatus for setting transmission time advance. The method comprises: detecting the current transmission time advance (TA) in a target time unit, and obtaining the detecting result; if the detecting result indicates that the current TA has failed, transmitting a random access signal to a base station by means of a first target resource, the random access signal being used for indicating that the base station requires configuration of a new TA to a client; receiving the new TA returned from the base station; and transmitting target data to the base station based on the new TA by means of a second target resource, the target data being required to be reported to the base station by the client. The present invention simplifies the random access process of the client, saves the client power and prevents waste of the second target resource.

20 Claims, 11 Drawing Sheets

---

101 — A present TA is detected in a target time unit to obtain a detection result 102 — In response to the detection result indicating that the present TA has expired, a random access signal is sent to a base station through a first target resource 103 — A new TA returned from the base station is received 104 — Target data is sent to the base station through a second target resource based on the new TA

(56) References Cited

U.S. PATENT DOCUMENTS

| | | |
|---|---|---|
| 2017/0347329 A1 | 11/2017 | Parkvall et al. |
| 2018/0098360 A1 | 4/2018 | Vos et al. |
| 2018/0152907 A1 | 5/2018 | Zhang et al. |
| 2019/0254052 A1 | 8/2019 | Liu et al. |
| 2019/0342848 A1 | 11/2019 | Zhang et al. |

FOREIGN PATENT DOCUMENTS

| | | | |
|---|---|---|---|
| CN | 104094548 A | 10/2014 | |
| CN | 106550415 A | 3/2017 | |
| CN | 106686669 A | 5/2017 | |
| CN | 107995636 A | 5/2018 | |
| WO | 2018076956 A1 | 5/2018 | |
| WO | 2018099387 A1 | 6/2018 | |

OTHER PUBLICATIONS

English translation of the Written Opinion of the International Search Authority in the International Application No. PCT/CN2018/113718, mailed on Jun. 25, 2019, (4p).

Nokia, Nokia Shanghai Bell, "Preconfigured Grant for Uplink transmission", 3GPP TSG RAN WG1 Meeting #94 R1-1811074, Chengdu, China, Oct. 8-12, 2018, (6p).

Notice of Allowance of the Chinese Application No. 201880002320.7, issued on May 20, 2021, (5p).

International Search Report of PCT Application No. PCT/CN2018/113718 dated Jun. 25, 2019 with English translation (4p).

* cited by examiner

METHOD AND APPARATUS FOR SETTING TRANSMISSION TIME ADVANCE

CROSS-REFERENCE TO RELATED APPLICATIONS

This application is a U.S. national stage of International Application No. PCT/CN2018/113718 filed on Nov. 2, 2018, the disclosure of which is hereby incorporated by reference in its entirety.

TECHNICAL FIELD

The present disclosure relates to the field of communications, and more particularly, to a timing advance (TA) setting method and device.

BACKGROUND

A data transmission flow of a traditional long term evolution (LTE) may be as illustrated in FIG. 1A, and a client may send uplink data to a base station only after completing a random access process to obtain the license of a base station. However, in a scenario of the internet of things of a new radio (NR) system, significant signaling overheads may be generated during the random access process. Therefore, an unlicensed mode may be adopted, it is unnecessary to perform random access and uplink license receiving, and the client automatically transmits uplink data on reserved resources according to a preset mode, as illustrated in FIG. 1B. Therefore, signaling overheads are reduced, and power waste is avoided.

In consideration of services of most clients of the internet of things being reported periodically, such as an electricity meter, a water meter and the like, service data may be reported at intervals, and then there are reserved resources configured in unlicensed uplink scheduling periodically.

In the uplink transmission of a traditional LTE system, in order to keep the simultaneous arrival of data at the base station from different clients so as to keep the data orthogonality and reduce the interference, the clients may send the data in advance according to a TA configured by the base station. In general, an initial TA is determined by the base station according to a random access preamble sent by the client in the random access process, and is sent to the client in a random access response (RAR) message. When a user accesses a network, an originally configured TA cannot meet the conditions due to the change of a wireless environment or the position movement of the user, and the TA needs to be updated through the random access process again.

In an unlicensed scheduling process, the client first uses a presently stored TA and verifies whether the TA stored at this moment is still valid. If the present TA has failed/expired, the client needs to initiate the random access process to regain a new TA.

In the internet of things, in order to save power, a client generally wakes up before a reserved resource configured for the client by an adjacent base station, and a corresponding flow is initiated to determine whether a present TA is valid; if the TA is found to be invalid, the client updates the TA through a random access process, thereby wasting the resources due to the fact that the client misses data transmission by using the reserved resources.

In addition, more steps are needed in the traditional random access process, and the whole process is too complicated for a client only obtaining new TA, such that the power saving is not facilitated.

SUMMARY

Embodiments of the present disclosure provide a TA setting method and device.

According to a first aspect of embodiments of the present disclosure, a TA setting method is provided, which may be applied to a client and may include: detecting a present TA in a target time unit to obtain a detection result; the target time unit may be any time unit prior to a first time unit corresponding to a first target resource, the first target resource may be a random access resource unit which is associated with a second target resource and meets specified conditions, and the second target resource may be any resource unit in a resource set which is pre-allocated to the client by a base station and configured to perform unlicensed data reporting; sending, in response to the detection result indicating that the present TA has expired, a random access signal to the base station through the first target resource, the random access signal may be configured to indicate that the base station needs to re-configure a new TA for the client; receiving the new TA returned from the base station; and sending target data to the base station through the second target resource based on the new TA, the target data may be data which needs to be reported to the base station by the client presently.

Optionally, the specified conditions may include: a time unit where the first target resource is located is prior to a time unit where the second target resource is located.

The specified conditions may further include: a target difference is minimum; or, the target difference is greater than or equal to a preset value, and the target difference is minimum; the target difference may be a difference between a time unit number of the time unit where the first target resource is located and a time unit number of the time unit where the second target resource is located.

Optionally, the random access signal may be a specified random access preamble pre-acquired by the client; the specified random access preamble may be a preamble which is pre-allocated to the client by the base station and configured to represent that the present TA of the client has expired.

Optionally, the operation of receiving the new TA returned from the base station may include: the new TA sent by the base station through a second random access signaling is received.

Optionally, the operation of receiving the new TA sent by the base station through the second random access signaling may include: a first physical downlink shared channel (PDSCH) sent by the base station through the second random access signaling is received; the first PDSCH may include first target RAR information corresponding to the client, and the first target RAR information may include a random access preamble, the new TA and a reserved value.

Optionally, the first PDSCH may be a PDSCH scheduled by using first target downlink control information (DCI), the first target DCI may be DCI scrambled by using a first radio network temporary identity (RNTI), and the first RNTI may be an RNTI configured to identify a resource block used by the client for sending the corresponding random access preamble.

Optionally, the operation of receiving the new TA sent by the base station through the second random access signaling may include: a second PDSCH sent by the base station through the second random access signaling is received; the second PDSCH may include second target RAR information corresponding to the client, and the second target RAR information may only include a random access preamble and the new TA.

Optionally, the second PDSCH may be a PDSCH scheduled by using second target DCI, the second target DCI may be DCI scrambled by using a second RNTI, and the second RNTI may be an RNTI configured to identify a resource block used by the client for sending the corresponding random access preamble.

Optionally, the second RNTI and the first RNTI may have different values.

Optionally, the operation of receiving the new TA sent by the base station through the second random access signaling may include: third target DCI sent by the base station through the second random access signaling is received; the third target DCI may include third target RAR information corresponding to the client, and the third target RAR information may at least include the new TA.

Optionally, the third target DCI may be DCI scrambled by using a third RNTI.

Optionally, the third RNTI may be determined by: taking an RNTI which is allocated to the client by the base station in a state of connection with the client and configured to identify a user service as the third RNTI; or taking a time unit number of a time unit corresponding to a random access preamble corresponding to the client as a value of the third RNTI.

According to a second aspect of embodiments of the present disclosure, a TA setting method is provided, which may be applied to a base station and may include: detecting, on a first target resource, whether a random access signal sent by a client is received; the first target resource may be a random access resource which is associated with a second target resource and meets specified conditions, and the second target resource may be any resource unit in a resource set which is pre-allocated to the client by the base station and configured to perform unlicensed data reporting; re-configuring, in response to the random access signal being detected on the first target resource, a new TA for the client according to the random access signal; returning the new TA to the client; and receiving target data which is sent by the client through the second target resource based on the new TA, the target data may be data which needs to be reported to the base station by the client presently.

Optionally, the specified conditions may include: a time unit where the first target resource is located is prior to a time unit where the second target resource is located.

The specified conditions may further include: a target difference is minimum; or the target difference is greater than or equal to a preset value, and the target difference is minimum; the target difference may be a difference between a time unit number of the time unit where the first target resource is located and a time unit number of the time unit where the second target resource is located.

Optionally, the random access signal may be a specified random access preamble pre-acquired by the client, and the specified random access preamble may be a preamble which is pre-allocated to the client by the base station and configured to represent that the present TA of the client has expired.

Optionally, the operation of returning the new TA to the client may include: the new TA is returned to the client through a second random access signaling.

Optionally, the operation of returning the new TA to the client through the second random access signaling may include: a first PDSCH is sent to the client through the second random access signaling; the first PDSCH may include first target RAR information corresponding to the client, and the first target RAR information may include a random access preamble, the new TA and a reserved value.

Optionally, the first PDSCH may be a PDSCH scheduled by using first target DCI, the first target DCI may be DCI scrambled by using a first RNTI, and the first RNTI may be an RNTI configured to identify a resource block used by the client for sending the corresponding random access preamble.

Optionally, the operation of returning the new TA to the client through the second random access signaling may include: a second PDSCH is sent to the client through the second random access signaling; the second PDSCH may include second target RAR information corresponding to the client, and the second target RAR information may only include a random access preamble and the new TA.

Optionally, the second PDSCH may be a PDSCH scheduled by using second target DCI, the second target DCI may be DCI scrambled by using a second RNTI, and the second RNTI may be an RNTI configured to identify a resource block used by the client for sending the corresponding random access preamble.

Optionally, the second RNTI and the first RNTI may have different values.

Optionally, the operation of returning the new TA to the client through the second random access signaling may include: third target DCI is sent to the client through the second random access signaling; the third target DCI may include third target RAR information corresponding to the client, and the third target RAR information may at least include the new TA.

Optionally, the third target DCI may be DCI scrambled by using a third RNTI.

Optionally, determining the third RNTI may include: taking an RNTI which is allocated to the client by the base station in a state of connection with the client and configured to identify a user service as the third RNTI; or taking a time unit number of a time unit corresponding to a random access preamble corresponding to the client as a value of the third RNTI.

According to a third aspect of embodiments of the present disclosure, a TA setting device is provided, which may be applied to a base station and may include: a first detection module, configured to detect a present TA in a target time unit to obtain a detection result; the target time unit may be any time unit prior to a first time unit corresponding to a first target resource, the first target resource may be a random access resource unit which is associated with a second target resource and meets specified conditions, and the second target resource may be any resource unit in a resource set which is pre-allocated to the client by a base station and configured to perform unlicensed data reporting; a first sending module, configured to send, in response to the detection result indicating that the present TA has expired, a random access signal to the base station through the first target resource, the random access signal may be configured to indicate that the base station needs to re-configure a new TA for the client; a first receiving module, configured to receive the new TA returned from the base station; and a second sending module, configured to send target data to the base station through the second target resource based on the new TA, the target data may be data which needs to be reported to the base station by the client presently.

Optionally, the specified conditions may include: a time unit where the first target resource is located is prior to a time unit where the second target resource is located.

The specified conditions may further include: a target difference is minimum; or the target difference is greater than or equal to a preset value, and the target difference is minimum; the target difference may be a difference between a time unit number of the time unit where the first target resource is located and a time unit number of the time unit where the second target resource is located.

Optionally, the random access signal may be a specified random access preamble pre-acquired by the client; the specified random access preamble may be a preamble which is pre-allocated to the client by the base station and configured to represent that the present TA of the client has expired.

Optionally, the first receiving module may include: a receiving sub-module, configured to receive the new TA sent by the base station through a second random access signaling.

Optionally, the receiving sub-module may include: a first receiving unit, configured to receive a first PDSCH sent by the base station through the second random access signaling; the first PDSCH may include first target RAR information corresponding to the client, and the first target RAR information may include a random access preamble, the new TA and a reserved value.

Optionally, the first PDSCH may be a PDSCH scheduled by using first target DCI, the first target DCI may be DCI scrambled by using a first RNTI, and the first RNTI may be an RNTI configured to identify a resource block used by the client for sending the corresponding random access preamble.

Optionally, the receiving sub-module may include: a second receiving unit, configured to receive a second PDSCH sent by the base station through the second random access signaling; the second PDSCH may include second target RAR information corresponding to the client, and the second target RAR information may only include a random access preamble and the new TA.

Optionally, the second PDSCH may be a PDSCH scheduled by using second target DCI, the second target DCI may be DCI scrambled by using a second RNTI, and the second RNTI may be an RNTI configured to identify a resource block used by the client for sending the corresponding random access preamble.

Optionally, the second RNTI and the first RNTI may have different values.

Optionally, the receiving sub-module may include: a third receiving unit, configured to receive third target DCI sent by the base station through the second random access signaling; the third target DCI may include third target RAR information corresponding to the client, and the third target RAR information may at least include the new TA.

Optionally, the third target DCI may be DCI scrambled by using a third RNTI.

Optionally, the device may further include: a first determination module, configured to take an RNTI which is allocated to the client by the base station in a state of connection with the client and configured to identify a user service as the third RNTI; or a second determination module, configured to take a time unit number of a time unit corresponding to a random access preamble corresponding to the client as a value of the third RNTI.

According to a fourth aspect of embodiments of the present disclosure, a TA setting device is provided, which may be applied to a base station and may include: a first detection module, configured to detect, on a first target resource, whether a random access signal sent by a client is received; the first target resource may be a random access resource which is associated with a second target resource and meets specified conditions, and the second target resource may be any resource unit in a resource set which is pre-allocated to the client by the base station and configured to perform unlicensed data reporting; an execution module, configured to re-configure, in response to the random access signal being detected on the first target resource, a new TA for the client according to the random access signal; a third sending module, configured to return the new TA to the client; and a second receiving module, configured to receive target data which is sent by the client through the second target resource based on the new TA, the target data may be data which needs to be reported to the base station by the client presently.

Optionally, the specified conditions may include: a time unit where the first target resource is located is prior to a time unit where the second target resource is located.

The specified conditions may further include: a target difference is minimum; or the target difference is greater than or equal to a preset value, and the target difference is minimum; the target difference may be a difference between a time unit number of the time unit where the first target resource is located and a time unit number of the time unit where the second target resource is located.

Optionally, the random access signal may be a specified random access preamble pre-acquired by the client, and the specified random access preamble may be a preamble which is pre-allocated to the client by the base station and configured to represent that the present TA of the client has expired.

Optionally, the third sending module may include: a sending sub-module, configured to return the new TA to the client through a second random access signaling.

Optionally, the sending sub-module may include: a first sending unit, configured to send a first PDSCH to the client through the second random access signaling; the first PDSCH may include first target RAR information corresponding to the client, and the first target RAR information may include a random access preamble, the new TA and a reserved value.

Optionally, the first PDSCH may be a PDSCH scheduled by using first target DCI, the first target DCI may be DCI scrambled by using a first RNTI, and the first RNTI may be an RNTI configured to identify a resource block used by the client for sending the corresponding random access preamble.

Optionally, the sending sub-module may include: a second sending unit, configured to send a second PDSCH to the client through the second random access signaling; and the second PDSCH may include second target RAR information corresponding to the client, and the second target RAR information may only include a random access preamble and the new TA.

Optionally, the second PDSCH may be a PDSCH scheduled by using second target DCI, the second target DCI may be DCI scrambled by using a second RNTI, and the second RNTI may be an RNTI configured to identify a resource block used by the client for sending the corresponding random access preamble.

Optionally, the second RNTI and the first RNTI may have different values.

Optionally, the sending sub-module may include: a third sending unit, configured to send third target DCI to the client through the second random access signaling; the third target DCI may include third target RAR information corresponding to the client, and the third target RAR information may at least include the new TA.

Optionally, the third target DCI may be DCI scrambled by using a third RNTI.

Optionally, the device may further include: a third determination module, configured to take an RNTI which is allocated to the client by the base station in a state of connection with the client and configured to identify a user service as the third RNTI; or a fourth determination module, configured to take a time unit number of a time unit corresponding to a random access preamble corresponding to the client as a value of the third RNTI.

According to a fifth aspect of embodiments of the present disclosure, a computer-readable storage medium is provided, which may store a computer program that is configured to execute the TA setting method described in the first aspect.

According to a sixth aspect of embodiments of the present disclosure, a computer-readable storage medium is provided, which may store a computer program that is configured to execute the TA setting method described in the second aspect.

According to a seventh aspect of embodiments of the present disclosure, a TA setting device is provided, which may be applied to a client and may include: a processor; and a memory configured to store instructions executable by the processor.

The processor may be configured to: detect a present TA in a target time unit to obtain a detection result; the target time unit may be any time unit prior to a first time unit corresponding to a first target resource, the first target resource may be a random access resource unit which is associated with a second target resource and meets specified conditions, and the second target resource may be any resource unit in a resource set which is pre-allocated to the client by a base station and configured to perform unlicensed data reporting; send, in response to the detection result indicating that the present TA has expired, a random access signal to the base station through the first target resource, the random access signal may be configured to indicate that the base station needs to re-configure a new TA for the client; receive the new TA returned from the base station; and send target data to the base station through the second target resource based on the new TA, the target data may be data which needs to be reported to the base station by the client presently.

According to an eighth aspect of embodiments of the present disclosure, a TA setting device is provided, which may be applied to a base station and may include: a processor; and a memory configured to store instructions executable by the processor.

The processor may be configured to: detect, on a first target resource, whether a random access signal sent by a client is received; the first target resource may be a random access resource which is associated with a second target resource and meets specified conditions, and the second target resource may be any resource unit in a resource set which is pre-allocated to the client by the base station and configured to perform unlicensed data reporting; re-configure, in response to the random access signal being detected on the first target resource, a new TA for the client according to the random access signal; return the new TA to the client; and receive target data which is sent by the client through the second target resource based on the new TA, the target data may be data which needs to be reported to the base station by the client presently.

The technical solution provided by the embodiments of the present disclosure may include the beneficial effects as follows.

In the embodiments of the present disclosure, a client may detect a present TA in advance, send a random access signal to a base station through a first target resource, i.e. a random access resource which is associated with a second target resource and meets specified conditions, and instruct the base station to re-allocate a new TA. Furthermore, the client may send data through the second target resource, i.e. any resource unit in a resource set which is pre-allocated to the client by the base station and configured to perform unlicensed data reporting. The random access process of the client is simplified, which is beneficial to save client power, and can avoid waste of the second target resource.

In the embodiments of the present disclosure, optionally, the specified conditions may include: a time unit where the first target resource is located is prior to a time unit where the second target resource is located. Furthermore, the specified conditions may further include: a target difference is minimum; or the target difference is greater than or equal to a preset value, and the target difference is minimum, the target difference may be a difference between a time unit number of the time unit where the first target resource is located and a time unit number of the time unit where the second target resource is located. It is ensured that the first target resource is prior to the second target resource, and the time unit where the first target resource is located is closest to the time unit where the second target resource is located, such that the purpose of detecting the present TA in advance by the client is achieved.

In the embodiments of the present disclosure, optionally, the random access signal may be a specified random access preamble pre-acquired by the client, and the specified random access preamble may be a preamble which is pre-allocated to the client by the base station and configured to represent that the present TA of the client has expired. Therefore, after the base station receives the specified random access preamble, it may be determined that the client presently needs the base station to re-configure a new TA.

In the embodiments of the present disclosure, after receiving the new TA sent by the base station through a second random access signaling, the client may send target data to the base station through the second target resource directly based on the new TA instead of executing a subsequent random access process. The random access process of the client is simplified, which is beneficial to save client power, and can avoid waste of the second target resource.

In the embodiments of the present disclosure, optionally, the client may receive a first PDSCH sent by the base station through the second random access signaling. The first PDSCH may include first target RAR information corresponding to the client, and the first target RAR information may include a random access preamble, the new TA and a reserved value. The purpose of acquiring the new TA which is re-configured for the client by the base station at the client is achieved.

In the embodiments of the present disclosure, the first PDSCH is scheduled through first DCI scrambled by using a first RNTI, such that the client can conveniently obtain the new TA configured for the client by the base station from the first PDSCH.

In the embodiments of the present disclosure, the client may also receive a second PDSCH sent by the base station through the second random access signaling. The second PDSCH may include second target RAR information corresponding to the client, the second target RAR information may include a random access preamble and the new TA. In the embodiments of the present disclosure, the first target RAR information may be simplified without including a reserved value, such that the simplified second target RAR information is obtained, and the purpose of acquiring the new TA which is re-configured for the client by the base station at the client is also achieved.

In the embodiments of the present disclosure, the second PDSCH is a PDSCH scheduled by using second target DCI, the second target DCI may be DCI scrambled by using a second RNTI, and the second RNTI may be an RNTI configured to identify a resource block used by the client for sending the corresponding random access preamble, such that the client can conveniently obtain the new TA configured for the client by the base station from the second PDSCH.

In the embodiments of the present disclosure, the second RNTI and the first RNTI have different values. After different pieces of DCI are scrambled through different RNTIs, the corresponding PDSCHs are scheduled, thereby enabling the client to obtain the new TA configured for the client by the base station.

In the embodiments of the present disclosure, the client may also receive third target DCI sent by the base station through the second random access signaling. The third target DCI includes third target RAR information corresponding to the client, and the third target RAR information may at least include the new TA. In the embodiments of the present disclosure, the RAR information may also be further simplified, and the third target RAR information may at least include the new TA and is sent to the client through the third target DCI, such that the purpose of acquiring the new TA which is re-configured for the client by the base station at the client is also achieved.

In the embodiments of the present disclosure, optionally, the third target DCI is DCI scrambled by using a third RNTI. The client may take an RNTI which is allocated to the client by the base station in a state of connection with the client and configured to identify a user service as the third RNTI, or the client may take a time unit number of a time unit corresponding to a random access preamble corresponding to the client as a value of the third RNTI. In the embodiments of the present disclosure, the client is identified through the third RNTI, such that the third target RAR information may only include the new TA.

In the embodiments of the present disclosure, if detecting that the random access signal sent by the client is received on the first target resource, the base station re-configures a new TA for the client according to the random access signal and return the new TA to the client. Therefore, the client may report the target data to the base station through the second target resource. The random access process of the client is simplified, which is beneficial to save client power, and can avoid waste of the second target resource.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

The terms used in the present disclosure are for the purpose of describing particular embodiments only, and are not intended to limit the present disclosure. "A/an", "the" and "this" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that although the terms first, second, third, etc. may be used in the present disclosure to describe various information, such information should not be limited to these terms. These terms are only used to distinguish the same type of information from each other. For example, without departing from the scope of the present disclosure, first information may also be called second information and, similarly, second information may also be called first information. For example, term "if" used here may be explained as "while" or "when" or "responsive to determining", which depends on the context.

The TA setting method provided by embodiments of the present disclosure will be described below from a client side first.

Figure 1A:
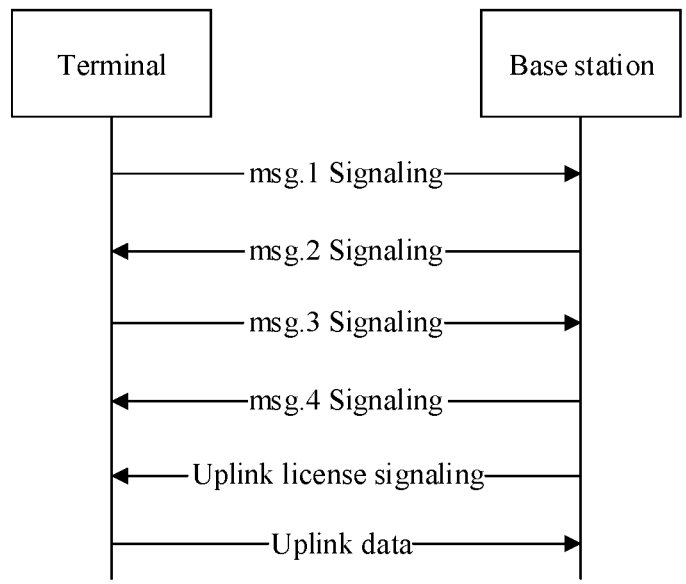
FIG. 1A is a schematic diagram of a data transmission flow.
Figure 1B:
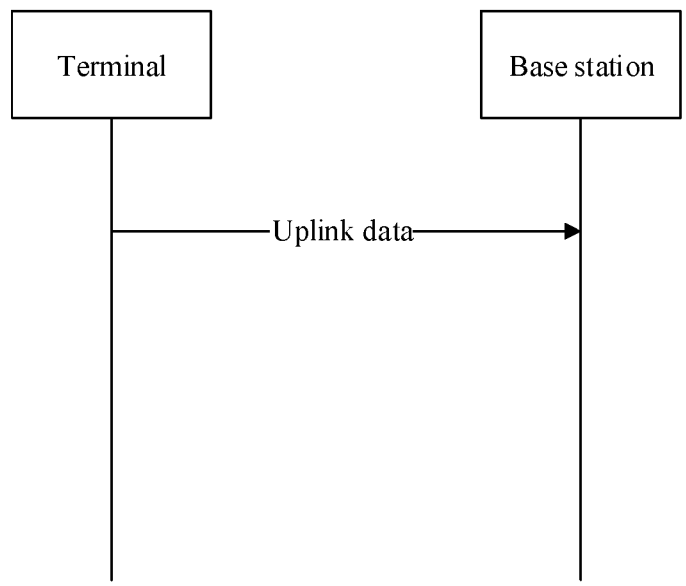
FIG. 1B is a schematic diagram of a data transmission flow of an unlicensed mode.
Figure 2:
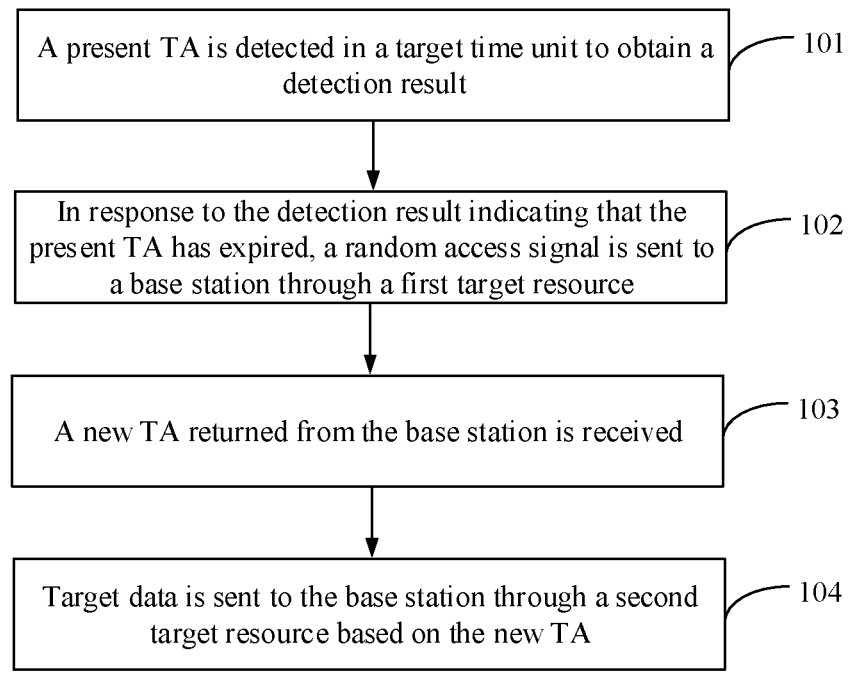
FIG. 2 is a flow chart showing a TA setting method, according to an exemplary embodiment.

Embodiments of the present disclosure provide a TA setting method, which may be applied to a client. Referring to FIG. 2, FIG. 2 is a flow chart showing a TA setting method, according to an exemplary embodiment. The method may include the following steps.

In step 101, a present TA is detected in a target time unit to obtain a detection result.

The target time unit is any time unit prior to a first time unit corresponding to a first target resource, the first target resource is a random access resource unit which is associated with a second target resource and meets specified condition(s), and the second target resource is any resource unit in a resource set which is pre-allocated to the client by a base station in the internet of things and configured to perform unlicensed data reporting.

In step 102, in response to the detection result indicating that the present TA has expired/is invalid, a random access signal is sent to the base station through the first target resource, and the random access signal is configured to indicate that the base station needs to re-configure a new TA for the client.

In step 103, the new TA returned from the base station is received.

In step 104, target data is sent to the base station through the second target resource based on the new TA, and the target data is data which needs to be reported to the base station by the client presently.

In the above embodiments, the random access process of the client is simplified, which is beneficial to save client power, and can avoid waste of the second target resource.

Figure 3A:
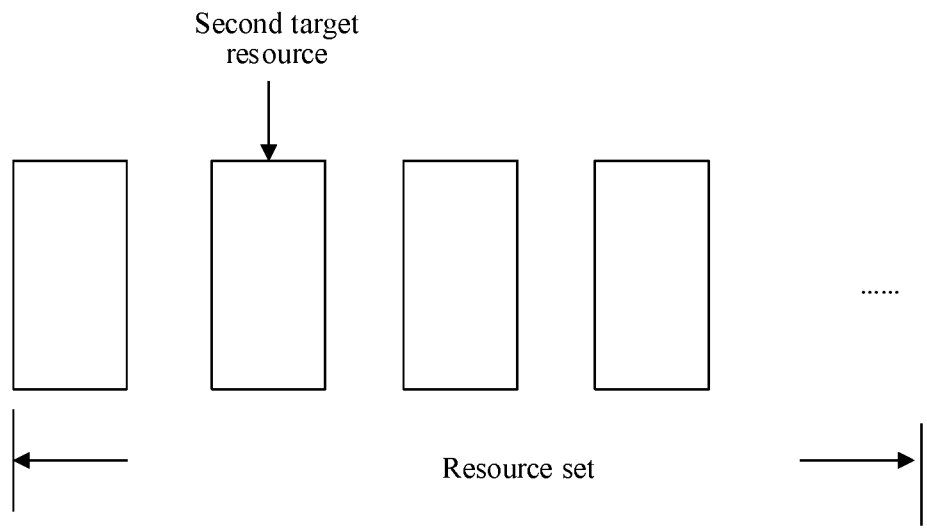
FIGS. 3A to 3C are schematic diagrams illustrating data transmission scenarios, according to an exemplary embodiment.

For the above step 101, the second target resource is described first. The second target resource is any resource unit in a resource set which is pre-allocated to the client by the base station and configured to perform unlicensed data reporting, as illustrated in FIG. 3A for example.

The first target resource is a random access resource which is associated with the second target resource, meets specified conditions and is configured to perform random access. The specified conditions predefined in a protocol may be directly obtained by the client, or the specified conditions may be configured for the client by the base station, and the client receives the preset conditions sent by the base station through a preset signaling such as a radio resource control (RRC) signaling.

In the embodiments of the present disclosure, the preset conditions may include: a time unit where the first target resource is located is prior to a time unit where the second target resource is located, and a target difference is minimum. The target difference is a difference between a time unit number of the time unit where the first target resource is located and a time unit number of the time unit where the second target resource is located.

Figure 3B:
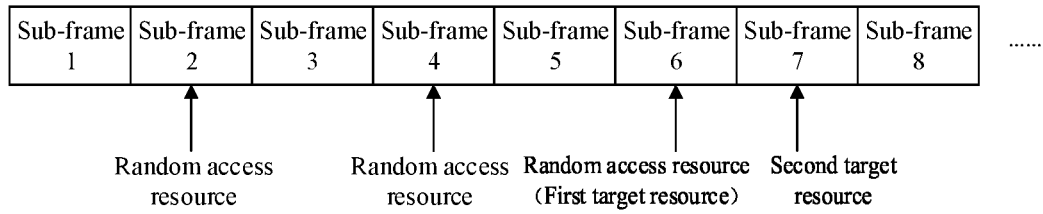

For example, the time unit where the second target resource is located is the 7th sub-frame, and random access resources are provided on the 2nd, 4th and 6th sub-frames. The client may take a resource unit corresponding to the 6th sub-frame as the first target resource, as illustrated in FIG. 3B.

Or, the specified conditions may include: a time unit where the first target resource is located is prior to a time unit where the second target resource is located, a target difference is greater than or equal to a preset value, and the target difference is minimum.

Figure 3C:
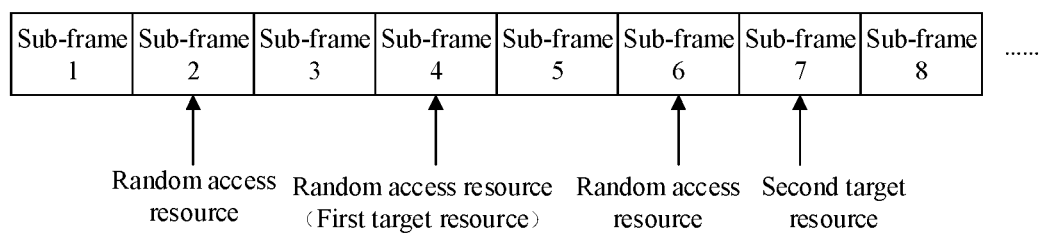

For example, the time unit where the second target resource is located is the 7th sub-frame, random access resources are provided on the 2nd, 4th and 6th sub-frames, and the preset value is 2. The client may take a resource unit corresponding to the 4th sub-frame as the first target resource, as illustrated in FIG. 3C.

In the embodiments of the present disclosure, the client needs to measure the present TA in the target time unit, i.e., to detect the present TA in any time unit prior to the time unit where the first target resource is located and determine whether the present TA is valid.

Optionally, the client may measure a present reference signal receiving power (RSRP) value, and determine that the present TA is still valid if a difference between the present RSRP value and an RSRP value measured in the previous successful data transmission is less than a preset threshold; otherwise, it is determined that the present TA has expired.

For the above step 102, when the detection result indicates that the present TA has expired, the client may send the random access signal to the base station through the first target resource, and the base station re-configures a new TA for the client according to the random access signal.

The random access signal may be a specified random access preamble pre-acquired by the client, and the specified random access preamble is a preamble which is pre-allocated to the client by the base station and configured to represent that the present TA of the client has expired.

Optionally, the client may send the specified random access preamble to the base station through a first random access signaling, such as an msg. 1 signaling, and after receiving the specified random access preamble, the base station may determine that a new TA presently needs to be re-configured for the client.

For the above step 103, after configuring the new TA for the client, the base station may send the new TA to the client through a second random access signaling, such as an msg. 2 signaling. The client may receive the new TA.

Optionally, the client may receive the new TA sent by the base station through the second random access signaling in any one of the following manners.

In the first manner, a first physical downlink shared channel PDSCH sent by the base station through the second random access signaling is received.

In this manner, the base station may add first target RAR information corresponding to the client in the first PDSCH. A length value of the first target RAR information may be the same as a length value of the RAR information, and the first target RAR information may multiplex the same PDSCH with multiple pieces of RAR information.

When a first PDSCH received by a user includes multiple pieces of RAR information, the user divides the received first PDSCH according to a length value of the RAR information. For example, the length value of the RAR information is 48 bit, and the first PDSCH received at this moment is 480 bit, such that the client may sequentially divide the first PDSCH into 10 pieces of RAR information, and the client sequentially determines the contents of the 10 pieces of RAR information and finds the first target RAR information corresponding to the client.

If the random access preamble and the new TA included in the first target RAR information occupy 8 bit and the length value of each RAR information is 10 bit, a length value of a reserved value in the first target RAR information is 2 bit.

After receiving the first target RAR information, the client may only read the random access preamble and the new TA therein, and the reserved value may not be read any more.

In addition, the base station schedules the first PDSCH through first target DCI. The first target DCI is DCI scrambled by using a first RNTI. The first RNTI is an RNTI configured to identify a resource block used by the client for sending the corresponding random access preamble. In the embodiments of the present disclosure, the first RNTI may be an RA-RNTI.

In the second manner, a second physical downlink shared channel PDSCH sent by the base station through the second random access signaling is received.

In this manner, the second PDSCH includes second target RAR information corresponding to the client. The second target RAR information is simplified relative to the first target RAR information, and may only include the random access preamble and the new TA.

If the reserved value is not included in the second target RAR information, the length value of the second RAR information is different from that of the RAR information. After receiving the second PDSCH, the client cannot know the length value of each RAR information. Therefore, it should be noted that, in the embodiments of the present disclosure, the second target RAR information cannot multiplex the same second PDSCH with the RAR information.

In this manner, after receiving the second PDSCH, the client may read the random access preamble and the new TA in the second target RAR information corresponding to the client.

In the embodiments of the present disclosure, the base station schedules the second PDSCH through second target DCI. The second target DCI is DCI scrambled by using a second RNTI. The second RNTI is an RNTI configured to identify a resource block used by the client for sending the corresponding random access preamble. In the embodiments of the present disclosure, the second RNTI may be an RA-RNTI', which has a value different from that of the first RNTI.

For example, $RA\text{-}RNTI'=1+t\_id+10\times f\_id+\text{offset}$; or $$RA\text{-}RNTI'=1+a\times t\_id+10\times t\_id.$$

Where t_id represents a sub-frame identity (in a value range of 0 to 9) of a start position for sending a preamble, f_id represents an f RA value (in a value range of 0 to 5) in a four-element group, and a and offset may be preset values or may be values configured by an RRC layer of the base station.

In the third manner, third target DCI sent by the base station through the second random access signaling is received.

In this manner, the third target RAR information may be sent to the client through the third target DCI, and the base station does not need to send the PDSCH to the client. The third target RAR information at least includes the new TA.

In the embodiments of the present disclosure, the third target DCI is DCI scrambled by using a third RNTI. Optionally, the client may take an RNTI which is allocated to the client by the base station in a state of connection with the client and configured to identify a user service as the third RNTI.

For example, the third target DCI is scrambled by using a C-RNTI, and the C-RNTI is an RNTI which is allocated to the client by the base station in a state of connection with the client and configured to identify a user service.

Or, the client may also take a time unit number of a time unit corresponding to the random access preamble corresponding to the client as a value of the third RNTI.

For example, the time unit number of the time unit corresponding to the random access preamble corresponding to the client is m, and then the value of the third RNTI at this moment is also m.

The client may descramble the received third target DCI according to the determined third RNTI, so as to obtain the new TA therein.

For the above step 104, after receiving the new TA returned from the base station, the client does not need to perform transmission of msg. 3 and msg. 4, and may directly send target data to the base station on the second target resource. The target data is data which needs to be reported to the base station by the client presently.

The TA setting method provided by the embodiments of the present disclosure will be described below from a base station side next.

Figure 4:
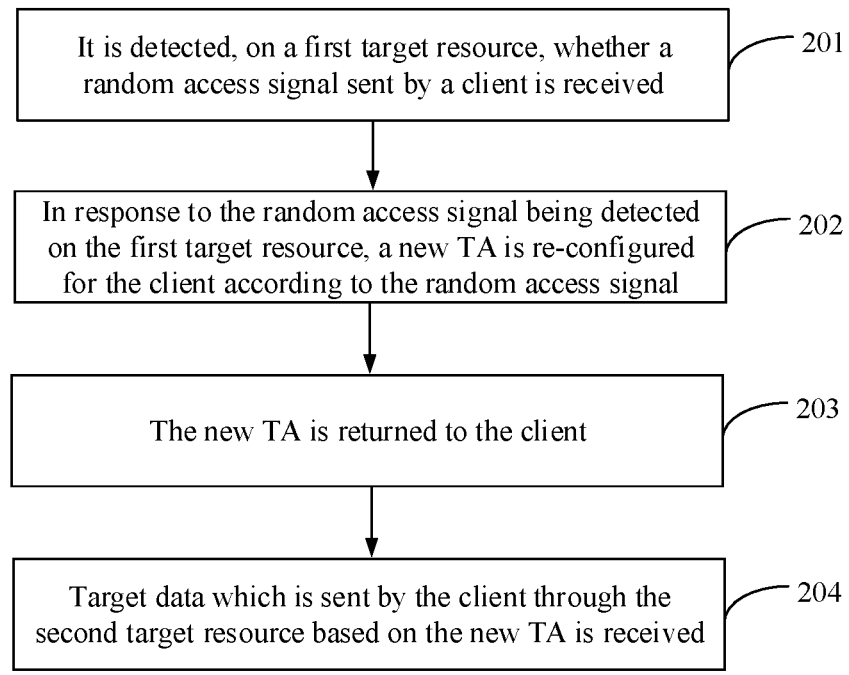
FIG. 4 is a flow chart showing another TA setting method, according to an exemplary embodiment.

The embodiments of the present disclosure provide a TA setting method, which may be applied to a client. Referring to FIG. 4, FIG. 4 is a flow chart showing a TA setting method, according to an exemplary embodiment. The method may include the following steps.

In step 201, it is detected, on a first target resource, whether a random access signal sent by a client is received.

The first target resource is a random access resource unit which is associated with a second target resource and meets specified conditions, and the second target resource is any resource unit in a resource set which is pre-allocated to the client by a base station and configured to perform unlicensed data reporting.

In step 202, in response to the random access signal being detected on the first target resource, a new TA is re-configured for the client according to the random access signal.

In step 203, the new TA is returned to the client.

In step 204, target data which is sent by the client through the second target resource based on the new TA is received, and the target data is data which needs to be reported to the base station by the client presently.

In the above embodiments, the random access process of the client is simplified, which is beneficial to save client power, and can avoid waste of the second target resource.

For the above step 201, the first target resource in this step is determined in the same manner as the first target resource in the above step 101, which is not repeated herein.

The base station may detect, on the first target resource, whether a random access signal sent by the client through a first random access signaling such as an msg. 1 signaling is received.

In the embodiments of the present disclosure, the random access signal may be a specified random access preamble pre-acquired by the client, and the specified random access preamble is a preamble which is pre-allocated to the client by the base station and configured to represent that the present TA of the client has expired.

For the above step 202, if the base station detects a specified random access preamble sent by the client through the first random access signaling such as the msg. 1 signaling on the first target resource, the base station may determine that a new TA needs to be configured for the client according to the specified random access preamble.

In the embodiments of the present disclosure, the base station may configure a new TA for the client in a manner of updating a TA.

For the above step 203, optionally, the step 203 may specifically include: returning the new TA to the client through a second random access signaling.

The second random access signaling may be an msg. 2 signaling.

Furthermore, the base station may return the new TA to the client through the second random access signaling in any one of the following manners.

In the first manner, a first physical downlink shared channel PDSCH is sent to the client through the second random access signaling.

In this manner, the base station may add first target RAR information corresponding to the client in the first PDSCH. A length value of the first target RAR information may be the same as a length value of the RAR information, and the first target RAR information may multiplex the same PDSCH with multiple pieces of RAR information.

After receiving the first target RAR information, the client may only read the random access preamble and the new TA therein, and the reserved value may not be read any more.

In addition, the base station schedules the first PDSCH through first target DCI. The first target DCI is DCI scrambled by using a first RNTI. The first RNTI is an RNTI configured to identify a resource block used by the client for sending the corresponding random access preamble. In the embodiments of the present disclosure, the first RNTI may be an RA-RNTI.

In the second manner, a second physical downlink shared channel PDSCH is sent to the client through the second random access signaling.

In this manner, the second PDSCH includes second target RAR information corresponding to the client. The second target RAR information is simplified relative to the first target RAR information, and may only include the random access preamble and the new TA.

It should be noted that, in the embodiments of the present disclosure, the second target RAR information cannot multiplex the same second PDSCH with the RAR information.

In this manner, after receiving the second PDSCH, the client may read the random access preamble and the new TA in the second target RAR information corresponding to the client.

In this manner, after receiving the second PDSCH, the client may read the random access preamble and the new TA in the second target RAR information corresponding to the client.

In the third manner, third target DCI is sent to the client through the second random access signaling.

In this manner, the third target RAR information may be sent to the client through the third target DCI, and the base station does not need to send the PDSCH to the client. The third target RAR information at least includes the new TA.

In the embodiments of the present disclosure, the third target DCI is DCI scrambled by using a third RNTI. Optionally, the base station may take an RNTI which is allocated to the client in a state of connection with the client and configured to identify a user service as the third RNTI.

For example, the third target DCI is scrambled by using a C-RNTI, and the C-RNTI is an RNTI which is allocated to the client by the base station in a state of connection with the client and configured to identify a user service.

Or, the base station may also take a time unit number of a time unit corresponding to the random access preamble corresponding to the client as a value of the third RNTI.

For example, the time unit number of the time unit corresponding to the random access preamble corresponding to the client is m, and then the value of the third RNTI at this moment is also m.

For the above step 204, the base station has updated the TA for the client, and the client does not need to perform transmission of msg. 3 and msg. 4 and may directly send target data to the base station on the second target resource based on the new TA. The base station may directly receive the target data.

Figure 5:
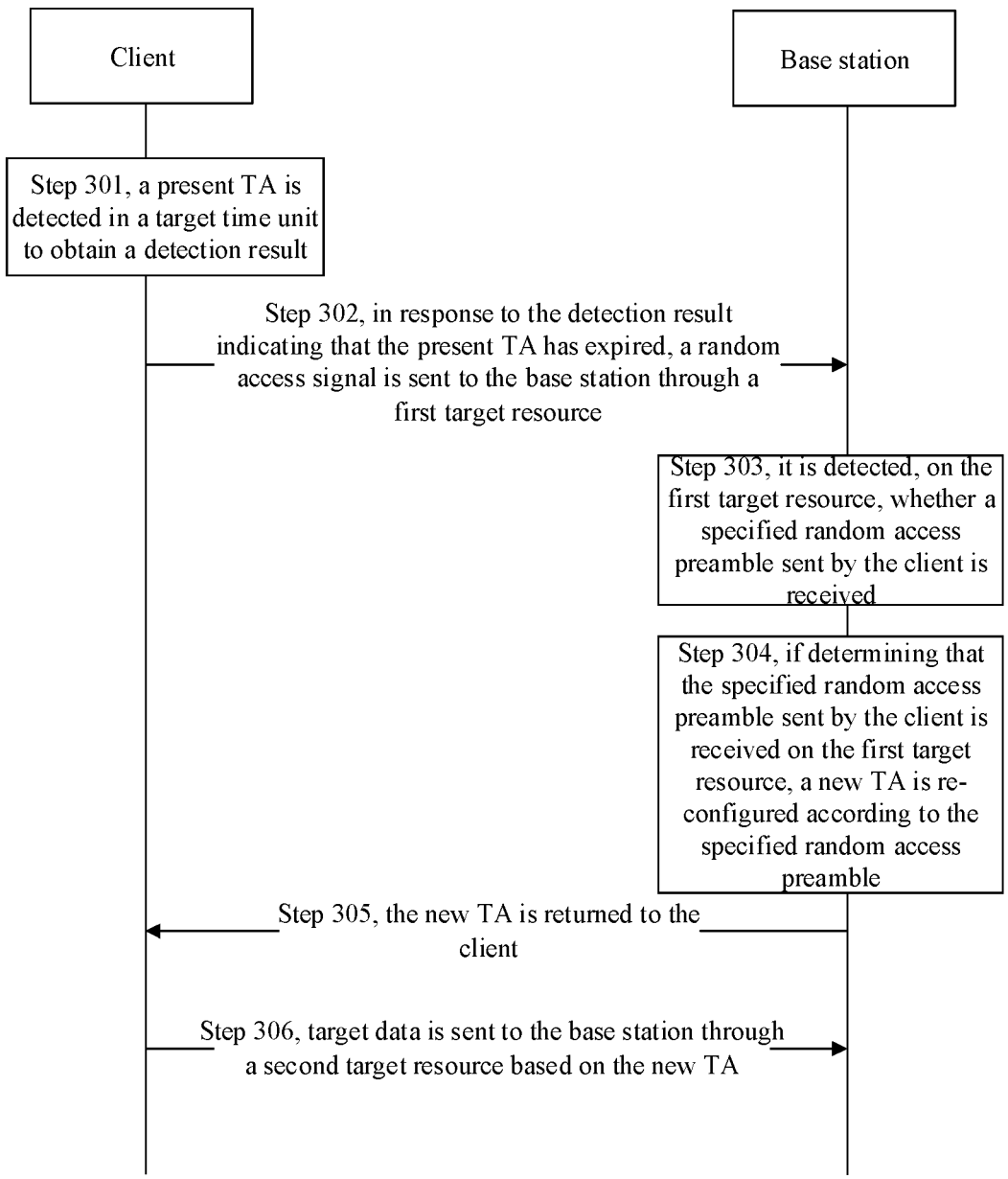
FIG. 5 is a flow chart showing another TA setting method, according to an exemplary embodiment.

In an embodiment, referring to FIG. 5, FIG. 5 is a flow chart showing a TA setting method, according to an exemplary embodiment. The method may include the following steps.

In step 301, a client detects a present TA in a target time unit to obtain a detection result.

The target time unit is any time unit prior to a first time unit corresponding to a first target resource, the first target resource is a random access resource unit which is associated with a second target resource and meets specified conditions, and the second target resource is any resource unit in a resource set which is pre-allocated to the client by a base station and configured to perform unlicensed data reporting.

In step 302, in response to the detection result indicating that the present TA has expired, the client sends a random access signal to the base station through the first target resource.

The client may send the random access signal to the base station through a first random access signaling such as msg. 1 and the first target resource. The random access signal is a specified random access preamble pre-acquired by the client, and the specified random access preamble is a preamble which is pre-allocated to the client by the base station and configured to represent that the present TA of the client has expired.

In step 303, the base station detects, on the first target resource, whether a specified random access preamble sent by the client is received.

In step 304, if determining that the specified random access preamble sent by the client is received on the first target resource, the base station re-configures a new TA for the client based on the specified random access preamble.

In step 305, the base station returns the new TA to the client.

Optionally, the base station may send a first PDSCH, a second PDSCH or third target DCI to the client through a second random access signaling such as an msg. 2 signaling.

In step 306, the client sends target data to the base station through the second target resource based on the new TA.

The target data is data which needs to be reported to the base station by the client presently.

In the above embodiments, the client may detect the present TA in advance, which simplifies the random access process of the client, is beneficial to save client power, and avoids waste of the second target resource.

Corresponding to the foregoing embodiment of an application function implementation method, the present disclosure also provides embodiments of an application function implementation device, and a corresponding client and base station.

Figure 6:
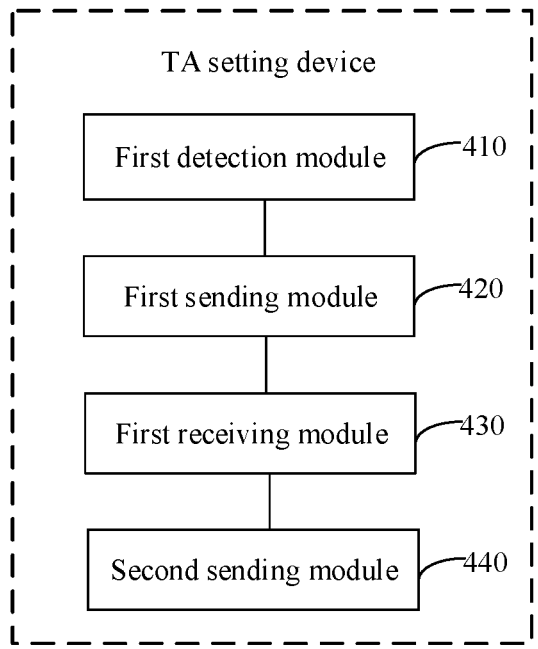
FIG. 6 is a block diagram of a TA setting device, according to an exemplary embodiment.

Referring to FIG. 6, FIG. 6 is a block diagram of a TA setting device, according to an exemplary embodiment. The device is applied to a client. The device includes: a first detection module 410, a first sending module 420, a first receiving module 430 and a second sending module 440.

The first detection module 410 is configured to detect a present TA in a target time unit to obtain a detection result.

The target time unit is any time unit prior to a first time unit corresponding to a first target resource, the first target resource is a random access resource unit which is associated with a second target resource and meets specified conditions, and the second target resource is any resource unit in a resource set which is pre-allocated to the client by a base station and configured to perform unlicensed data reporting.

The first sending module 420 is configured to send, in response to the detection result indicating that the present TA has expired, a random access signal to the base station through the first target resource, and the random access signal is configured to indicate that the base station needs to re-configure a new TA for the client.

The first receiving module 430 is configured to receive the new TA returned from the base station.

The second sending module 440 is configured to send target data to the base station through the second target resource based on the new TA, and the target data is data which needs to be reported to the base station by the client presently.

Optionally, the specified conditions include: a time unit where the first target resource is located is prior to a time unit where the second target resource is located.

The specified conditions further include: a target difference is minimum; or the target difference is greater than or equal to a preset value, and the target difference is minimum.

The target difference is a difference between a time unit number of the time unit where the first target resource is located and a time unit number of the time unit where the second target resource is located.

Optionally, the random access signal is a specified random access preamble pre-acquired by the client.

The specified random access preamble is a preamble which is pre-allocated to the client by the base station and configured to represent that the present TA of the client has expired.

Figure 7:
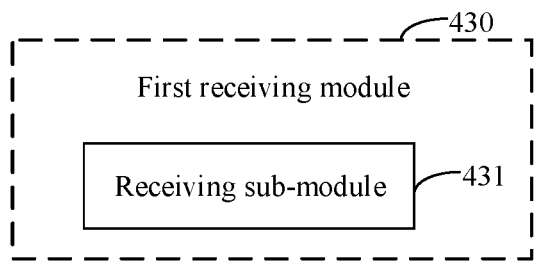
FIG. 7 is a block diagram of another TA setting device, according to an exemplary embodiment.

Referring to FIG. 7, FIG. 7 is a block diagram of another TA setting device on the basis of the embodiment illustrated in FIG. 6. The first receiving module 430 includes: a receiving sub-module 431, configured to receive the new TA sent by the base station through a second random access signaling.

Figure 8:
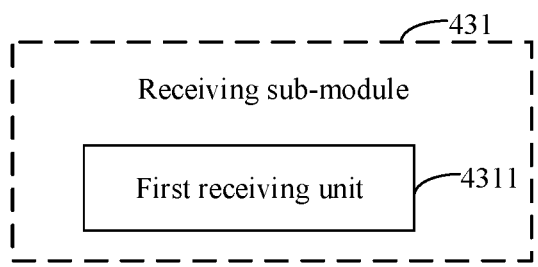
FIG. 8 is a block diagram of another TA setting device, according to an exemplary embodiment.

Referring to FIG. 8, FIG. 8 is a block diagram of another TA setting device on the basis of the embodiment illustrated in FIG. 7. The receiving sub-module 431 includes: a first receiving unit 4311, configured to receive a first physical downlink shared channel (PDSCH) sent by the base station through the second random access signaling.

The first PDSCH includes first target RAR information corresponding to the client, and the first target RAR information includes the random access preamble, the new TA, and a reserved value.

Optionally, the first PDSCH is a PDSCH scheduled by using first target DCI, the first target DCI is DCI scrambled by using a first RNTI, and the first RNTI is an RNTI configured to identify a resource block used by the client for sending the corresponding random access preamble.

Figure 9:
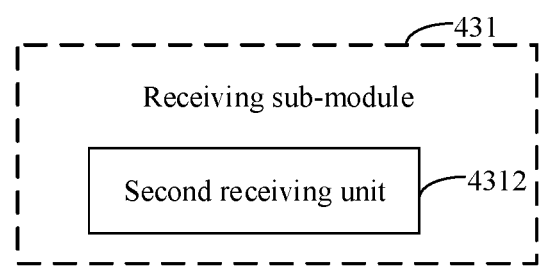
FIG. 9 is a block diagram of another TA setting device, according to an exemplary embodiment.

Referring to FIG. 9, FIG. 9 is a block diagram of another TA setting device on the basis of the embodiment illustrated in FIG. 7. The receiving sub-module 431 includes: a second receiving unit 4312, configured to receive a second PDSCH sent by the base station through the second random access signaling.

The second PDSCH includes second target RAR information corresponding to the client, and the second target RAR information only includes the random access preamble and the new TA.

Optionally, the second PDSCH is a PDSCH scheduled by using second target DCI, the second target DCI is DCI scrambled by using a second RNTI, and the second RNTI is an RNTI configured to identify a resource block used by the client for sending the corresponding random access preamble.

Optionally, the second RNTI and the first RNTI have different values.

Figure 10:
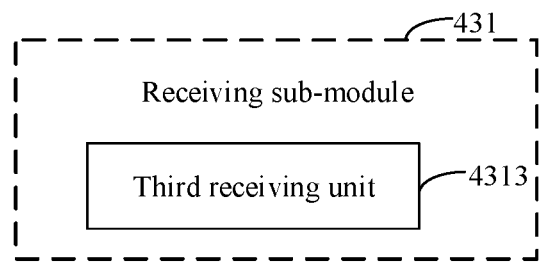
FIG. 10 is a block diagram of another TA setting device, according to an exemplary embodiment.

Referring to FIG. 10, FIG. 10 is a block diagram of another TA setting device on the basis of the embodiment illustrated in FIG. 7. The receiving sub-module 431 includes: a third receiving unit 4313, configured to receive third target DCI sent by the base station through the second random access signaling.

The third target DCI includes third target RAR information corresponding to the client, and the third target RAR information at least includes the new TA.

Optionally, the third target DCI is DCI scrambled by using a third RNTI.

Figure 11:
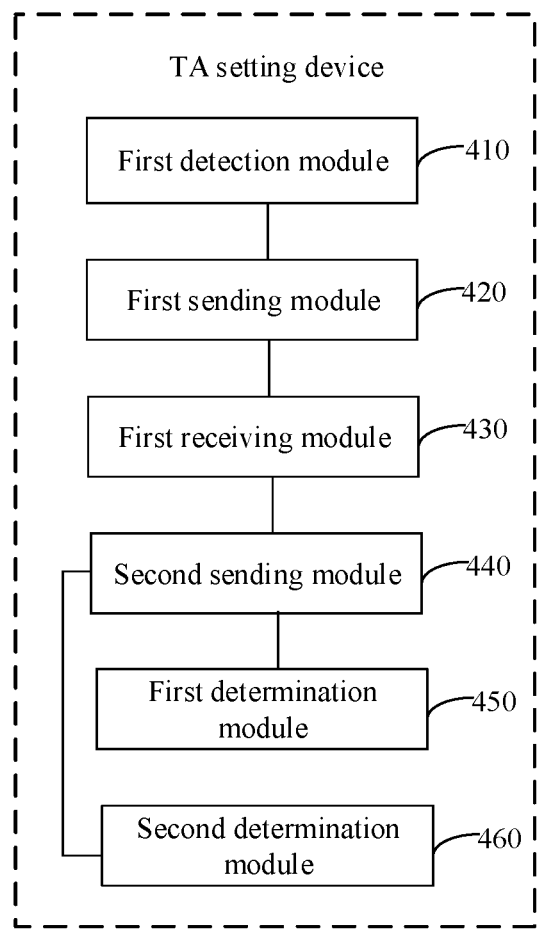
FIG. 11 is a block diagram of another TA setting device, according to an exemplary embodiment.

Referring to FIG. 11, FIG. 11 is a block diagram of another TA setting device on the basis of the embodiment illustrated in FIG. 6. The device further includes: a first determination module 450 or a second determination module 460.

The first determination module 450 is configured to take an RNTI which is allocated to the client by the base station in a state of connection with the client and configured to identify a user service as the third RNTI.

The second determination module 460 is configured to take a time unit number of a time unit corresponding to a random access preamble corresponding to the client as a value of the third RNTI.

Figure 12:
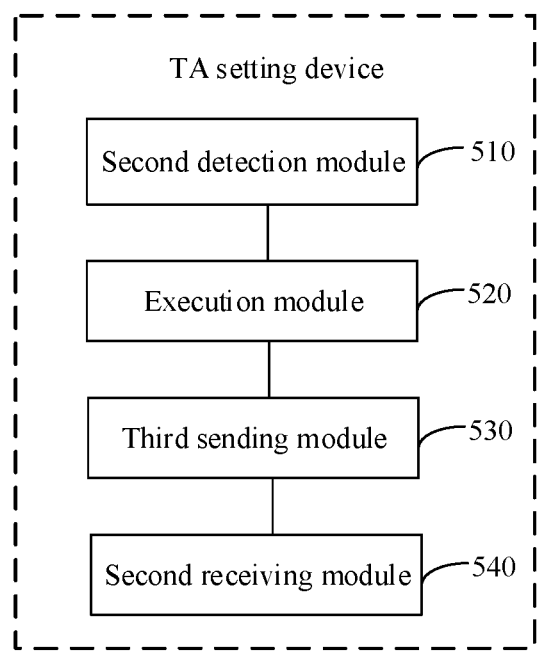
FIG. 12 is a block diagram of another TA setting device, according to an exemplary embodiment.

Referring to FIG. 12, FIG. 12 is a block diagram of a TA setting device, according to an exemplary embodiment. The device is applied to a base station. The device includes: a second detection module 510, an execution module 520, a third sending module 530 and a second receiving module 540.

The second detection module 510 is configured to detect, on a first target resource, whether a random access signal sent by a client is received.

The first target resource is a random access resource which is associated with a second target resource and meets specified conditions, and the second target resource is any resource unit in a resource set which is pre-allocated to the client by a base station and configured to perform unlicensed data reporting.

The execution module 520 is configured to re-configure, in response to the random access signal being detected on the first target resource, a new TA for the client according to the random access signal.

The third sending module 530 is configured to return the new TA to the client.

The second receiving module 540 is configured to receive target data which is sent by the client through the second target resource based on the new TA, and the target data is data which needs to be reported to the base station by the client presently.

Optionally, the specified conditions include: a time unit where the first target resource is located is prior to a time unit where the second target resource is located.

The specified conditions further include: a target difference is minimum; or the target difference is greater than or equal to a preset value, and the target difference is minimum.

The target difference is a difference between a time unit number of the time unit where the first target resource is located and a time unit number of the time unit where the second target resource is located.

Optionally, the random access signal is a specified random access preamble pre-acquired by the client, and the specified random access preamble is a preamble which is pre-allocated to the client by the base station and configured to represent that the present TA of the client has expired.

Figure 13:
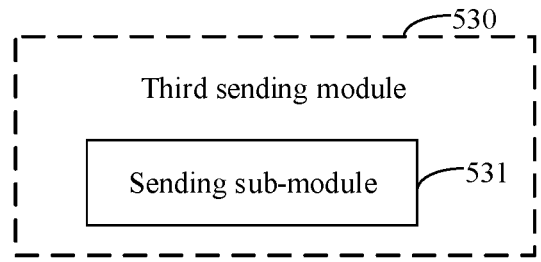
FIG. 13 is a block diagram of another TA setting device, according to an exemplary embodiment.

Referring to FIG. 13, FIG. 13 is a block diagram of another TA setting device on the basis of the embodiment illustrated in FIG. 12. The third sending module 530 includes: a sending sub-module 531, configured to return the new TA to the client through a second random access signaling.

Figure 14:
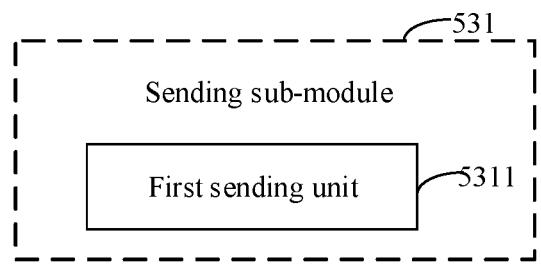
FIG. 14 is a block diagram of another TA setting device, according to an exemplary embodiment.

Referring to FIG. 14, FIG. 14 is a block diagram of another TA setting device on the basis of the embodiment illustrated in FIG. 13. The sending sub-module 531 includes: a first sending unit 5311, configured to send a first PDSCH to the client through the second random access signaling.

The first PDSCH includes first target RAR information corresponding to the client, and the first target RAR information includes the random access preamble, the new TA and a reserved value.

Optionally, the first PDSCH is a PDSCH scheduled by using first target DCI, the first target DCI is DCI scrambled by using a first RNTI, and the first RNTI is an RNTI configured to identify a resource block used by the client for sending the corresponding random access preamble.

Figure 15:
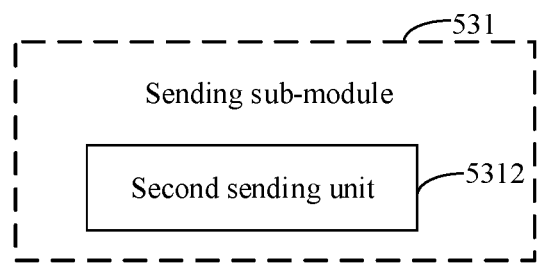
FIG. 15 is a block diagram of another TA setting device, according to an exemplary embodiment.

Referring to FIG. 15, FIG. 15 is a block diagram of another TA setting device on the basis of the embodiment illustrated in FIG. 13. The sending sub-module 531 includes: a second sending unit 5312, configured to send a second PDSCH to the client through the second random access signaling.

The second PDSCH includes second target RAR information corresponding to the client, and the second target RAR information only includes the random access preamble and the new TA.

Optionally, the second PDSCH is a PDSCH scheduled by using second target DCI, the second target DCI is DCI scrambled by using a second RNTI, and the second RNTI is an RNTI configured to identify a resource block used by the client for sending the corresponding random access preamble.

Optionally, the second RNTI and the first RNTI have different values.

Figure 16:
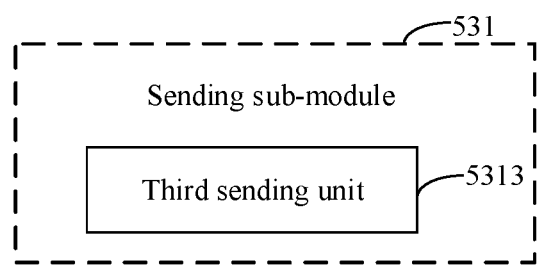
FIG. 16 is a block diagram of another TA setting device, according to an exemplary embodiment.

Referring to FIG. 16, FIG. 16 is a block diagram of another TA setting device on the basis of the embodiment illustrated in FIG. 13. The sending sub-module 531 includes: a third sending unit 5313, configured to send third target DCI to the client through the second random access signaling.

The third target DCI includes third target RAR information corresponding to the client, and the third target RAR information at least includes the new TA.

Optionally, the third target DCI is DCI scrambled by using a third RNTI.

Figure 17:
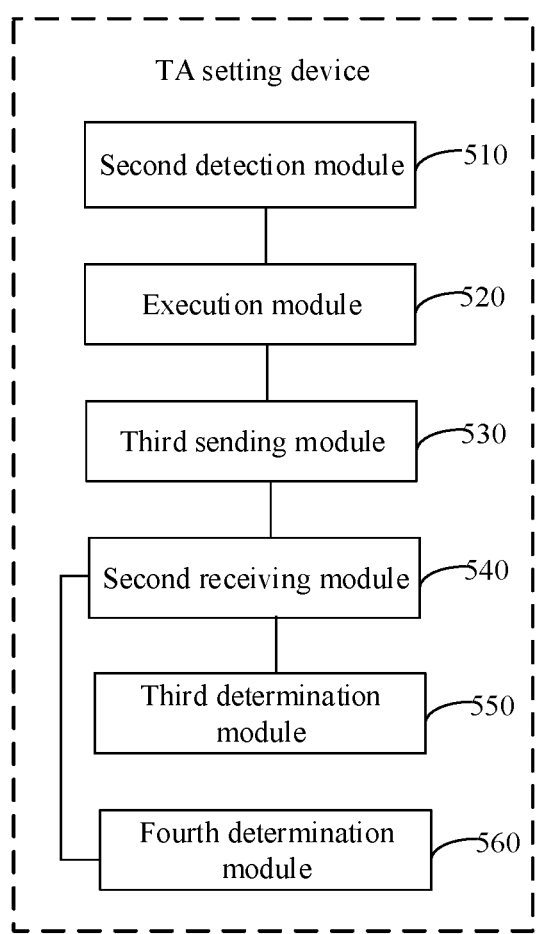
FIG. 17 is a block diagram of another TA setting device, according to an exemplary embodiment.

Referring to FIG. 17, FIG. 17 is a block diagram of another TA setting device on the basis of the embodiment illustrated in FIG. 12. The device further includes: a third determination module 550 or a fourth determination module 560.

The third determination module 550 is configured to take an RNTI which is allocated to the client by the base station in a state of connection with the client and configured to identify a user service as the third RNTI.

The fourth determination module 560 is configured to take a time unit number of a time unit corresponding to a random access preamble corresponding to the client as a value of the third RNTI.

For device embodiments, reference will now be made in part to the description of the method embodiments, since they substantially correspond to the method embodiments. The device embodiments described above are merely illustrative. The units described above as separated components may or may not be physically separated, and components shown as units may or may not be physical units, i.e., may be located at one place, or may be distributed across multiple network units. Some or all of the modules may be selected to achieve the objectives of the solution of the present disclosure according to practical requirements. Those skilled in the art would understand and practice without involving any inventive effort.

Accordingly, the present disclosure also provides a computer-readable storage medium, which stores a computer program that is configured to execute any above TA setting method applied to a client side.

Accordingly, the present disclosure also provides a computer-readable storage medium, which stores a computer program that is configured to execute any above TA setting method applied to a base station side.

Accordingly, the present disclosure also provides a TA setting device, which is applied to a client and includes: a processor; and a memory configured to store instructions executable by the processor.

The processor is configured to: detect a present TA in a target time unit to obtain a detection result; the target time unit is any time unit prior to a first time unit corresponding to a first target resource, the first target resource is a random access resource unit which is associated with a second target resource and meets specified conditions, and the second target resource is any resource unit in a resource set which is pre-allocated to the client by a base station and configured to perform unlicensed data reporting; send, in response to the detection result indicating that the present TA has expired, a random access signal to the base station through the first target resource, and the random access signal is configured to indicate that the base station needs to re-configure a new TA for the client; receive the new TA returned from the base station; and send target data to the base station through the second target resource based on the new TA, and the target data is data which needs to be reported to the base station by the client presently.

Figure 18:
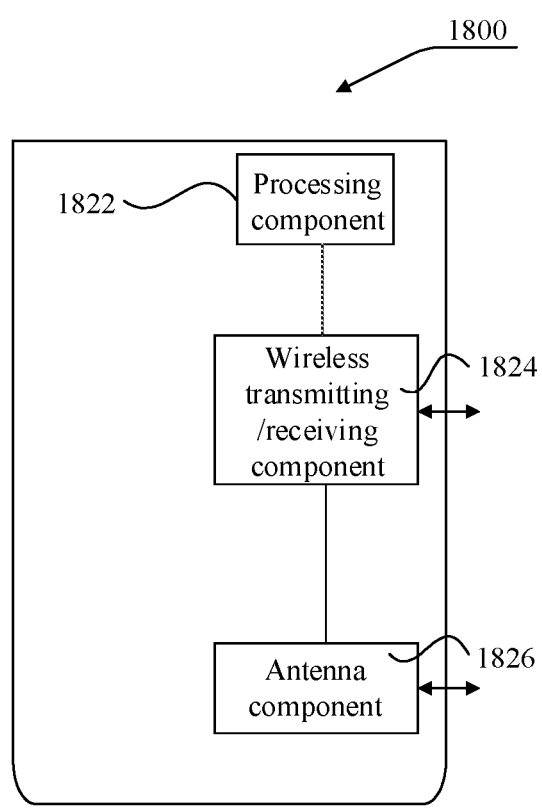
FIG. 18 is a schematic structural diagram illustrating a TA setting device, according to an exemplary embodiment of the present disclosure.

As illustrated in FIG. 18, FIG. 18 is a schematic structural diagram illustrating a data transmission device 1800, according to an exemplary embodiment. The device 1800 may be provided as a client. Referring to FIG. 18, the device 1800 includes a processing component 1822, a wireless transmitting/receiving component 1824, a wireless component 1826, and a signal processing portion specific to a wireless interface. The processing component 1822 may further include one or more processors.

One of the processors in the processing component 1822 may be configured to execute any above TA setting method at a client side.

Accordingly, the present disclosure also provides a TA setting device, which is applied to a base station and includes: a processor; and a memory configured to store instructions executable by the processor.

The processor is configured to: detect, on a first target resource, whether a random access signal sent by a client is received; the first target resource is a random access resource which is associated with a second target resource and meets specified conditions, and the second target resource is any resource unit in a resource set which is pre-allocated to the client by a base station and configured to perform unlicensed data reporting; re-configure, in response to the random access signal being detected on the first target resource, a new TA for the client according to the random access signal; return the new TA to the client; and receive target data which is sent by the client through the second target resource based on the new TA, the target data is data which needs to be reported to the base station by the client presently.

Figure 19:
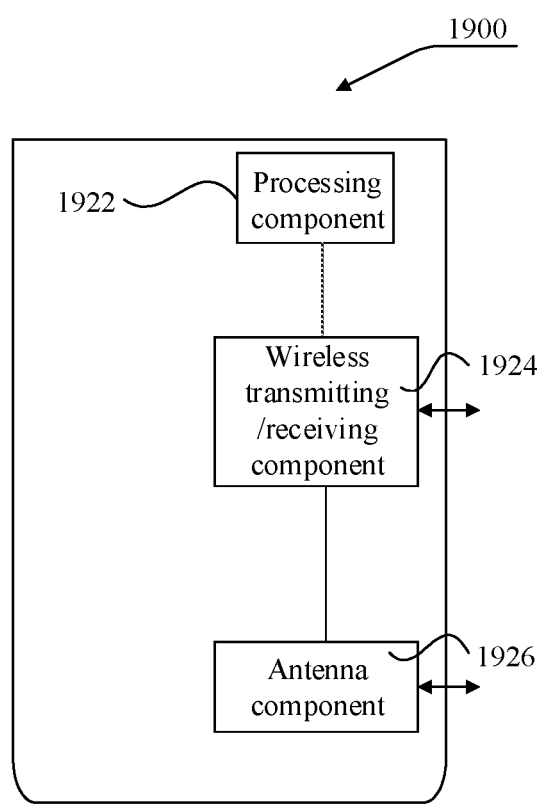
FIG. 19 is a schematic structural diagram illustrating another TA setting device, according to an exemplary embodiment of the present disclosure.

As illustrated in FIG. 19, FIG. 19 is a schematic structural diagram illustrating a data transmission device 1900, according to an exemplary embodiment. The device 1900 may be provided as a base station. Referring to FIG. 19, the device 1900 includes a processing component 1922, a wireless transmitting/receiving component 1924, a wireless component 1926, and a signal processing portion specific to a wireless interface. The processing component 1922 may further include one or more processors.

One of the processors in the processing component 1922 may be configured to execute any above TA setting method at a base station side.

After considering the specification and implementing the present disclosure disclosed here, other implementation solutions of the present disclosure would readily be conceivable to a person skilled in the art. The present disclosure is intended to cover any variations, uses, or adaptations of the present disclosure following the general principles thereof and including such departures from the present disclosure as come within known or customary practice in the art. It is intended that the specification and examples be considered as exemplary only.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It is to be understood that the present disclosure is not limited to the exact construction that has been described above and illustrated in the accompanying drawings, and that various modifications and changes can be made without departing from the scope thereof.

What is claimed is:

1. A timing advance (TA) setting method, applied to a client, comprising:
   detecting a present TA in a target time unit to obtain a detection result;
   wherein the target time unit is any time unit prior to a first time unit corresponding to a first target resource, the first target resource is a random access resource unit which is associated with a second target resource and meets specified conditions, and the second target resource is any resource unit in a resource set which is pre-allocated to the client by a base station and configured to perform unlicensed data reporting;
   sending, in response to the detection result indicating that the present TA has expired, a random access signal to the base station through the first target resource, wherein the random access signal is configured to indicate that the base station needs to re-configure a new TA for the client;
   receiving the new TA returned from the base station; and
   sending target data to the base station through the second target resource based on the new TA, wherein the target data is data which needs to be reported to the base station by the client presently.

2. The method of claim 1, wherein the specified conditions comprise:
   a time unit where the first target resource is located is prior to a time unit where the second target resource is located;
   wherein the specified conditions further comprise:
   a target difference is minimum; or
   the target difference is greater than or equal to a preset value, and the target difference is minimum;
   wherein the target difference is a difference between a time unit number of the time unit where the first target resource is located and a time unit number of the time unit where the second target resource is located.

3. The method of claim 1, wherein the random access signal is a specified random access preamble pre-acquired by the client;
   wherein the specified random access preamble is a preamble which is pre-allocated to the client by the base station and configured to represent that the present TA of the client has expired.

4. The method of claim 1, wherein the receiving the new TA returned from the base station comprises:
   receiving the new TA sent by the base station through a second random access signaling;
   wherein the receiving the new TA sent by the base station through the second random access signaling comprises:
   receiving a first physical downlink shared channel (PDSCH) sent by the base station through the second random access signaling;
   wherein the first PDSCH comprises first target random access response (RAR) information corresponding to the client, and the first target RAR information comprises a random access preamble, the new TA and a reserved value;
   wherein the first PDSCH is a PDSCH scheduled by using first target downlink control information (DCI), the first target DCI is DCI scrambled by using a first radio network temporary identity (RNTI), and the first RNTI is an RNTI configured to identify a resource block used by the client for sending the corresponding random access preamble; or
   wherein the receiving the new TA sent by the base station through the second random access signaling comprises:
   receiving a second PDSCH sent by the base station through the second random access signaling;
   wherein the second PDSCH comprises second target RAR information corresponding to the client, and the second target RAR information only comprises a random access preamble and the new TA;

wherein the second PDSCH is a PDSCH scheduled by using second target DCI, the second target DCI is DCI scrambled by using a second RNTI, and the second RNTI is an RNTI configured to identify a resource block used by the client for sending the corresponding random access preamble.

5. The method of claim 4, wherein the second RNTI and the first RNTI have different values.

6. The method of claim 4, wherein the receiving the new TA sent by the base station through the second random access signaling comprises:

receiving third target DCI sent by the base station through the second random access signaling;

wherein the third target DCI comprises third target RAR information corresponding to the client, and the third target RAR information at least comprises the new TA;

wherein the third target DCI is DCI scrambled by using a third RNTI;

wherein determining the third RNTI comprises:

taking an RNTI which is allocated to the client by the base station in a state of connection with the client and configured to identify a user service as the third RNTI; or taking a time unit number of a time unit corresponding to a random access preamble corresponding to the client as a value of the third RNTI.

7. A timing advance (TA) setting method, applied to a base station, comprising:

detecting, on a first target resource, whether a random access signal sent by a client is received;

wherein the first target resource is a random access resource which is associated with a second target resource and meets specified conditions, and the second target resource is any resource unit in a resource set which is pre-allocated to the client by the base station and configured to perform unlicensed data reporting;

re-configuring, in response to the random access signal being detected on the first target resource, a new TA for the client according to the random access signal;

returning the new TA to the client; and receiving target data which is sent by the client through the second target resource based on the new TA, wherein the target data is data which needs to be reported to the base station by the client presently.

8. The method of claim 7, wherein the specified conditions comprise:

a time unit where the first target resource is located is prior to a time unit where the second target resource is located;

wherein the specified conditions further comprise:

a target difference is minimum; or the target difference is greater than or equal to a preset value, and the target difference is minimum;

wherein the target difference is a difference between a time unit number of the time unit where the first target resource is located and a time unit number of the time unit where the second target resource is located.

9. The method of claim 7, wherein the random access signal is a specified random access preamble pre-acquired by the client, and the specified random access preamble is a preamble which is pre-allocated to the client by the base station and configured to represent that the present TA of the client has expired.

10. The method of claim 7, wherein the returning the new TA to the client comprises:

returning the new TA to the client through a second random access signaling.

11. The method of claim 10, wherein the returning the new TA to the client through the second random access signaling comprises:

sending a first physical downlink shared channel (PDSCH) to the client through the second random access signaling;

wherein the first PDSCH comprises first target random access response (RAR) information corresponding to the client, and the first target RAR information comprises a random access preamble, the new TA and a reserved value.

12. The method of claim 11, wherein the first PDSCH is a PDSCH scheduled by using first target downlink control information (DCI), the first target DCI is DCI scrambled by using a first radio network temporary identity (RNTI), and the first RNTI is an RNTI configured to identify a resource block used by the client for sending the corresponding random access preamble.

13. The method of claim 12, wherein the second RNTI and the first RNTI have different values.

14. The method of claim 10, wherein the returning the new TA to the client through the second random access signaling comprises:

sending a second PDSCH to the client through the second random access signaling;

wherein the second PDSCH comprises second target RAR information corresponding to the client, and the second target RAR information only comprises a random access preamble and the new TA.

15. The method of claim 14, wherein the second PDSCH is a PDSCH scheduled by using second target DCI, the second target DCI is DCI scrambled by using a second RNTI, and the second RNTI is an RNTI configured to identify a resource block used by the client for sending the corresponding random access preamble.

16. The method of claim 10, wherein the returning the new TA to the client through the second random access signaling comprises:

sending third target DCI to the client through the second random access signaling;

wherein the third target DCI comprises third target RAR information corresponding to the client, and the third target RAR information at least comprises the new TA.

17. The method of claim 16, wherein the third target DCI is DCI scrambled by using a third RNTI.

18. The method of claim 17, wherein determining the third RNTI comprises:

taking an RNTI which is allocated to the client by the base station in a state of connection with the client and configured to identify a user service as the third RNTI; or taking a time unit number of a time unit corresponding to a random access preamble corresponding to the client as a value of the third RNTI.

19. A timing advance (TA) setting device implementing operations of the TA setting method of claim 1, applied to a client, comprising;

a processor; and a memory for storing instructions executable by the processor;

wherein the processor is configured to:

detect a present TA in a target time unit to obtain a detection result;

wherein the target time unit is any time unit prior to a first time unit corresponding to a first target resource, the first target resource is a random access resource unit which is associated with a second target resource and meets specified conditions, and the second target resource is any resource unit in a resource set which is pre-allocated to the client by a base station and configured to perform unlicensed data reporting;

send, in response to the detection result indicating that the present TA has expired, a random access signal to the base station through the first target resource, wherein the random access signal is configured to indicate that the base station needs to re-configure a new TA for the client;

receive the new TA returned from the base station; and send target data to the base station through the second target resource based on the new TA, wherein the target data is data which needs to be reported to the base station by the client presently.

20. A timing advance (TA) setting device, applied to a base station, comprising:

a processor; and a memory for storing instructions executable by the processor;

wherein the processor is configured to:

detect, on a first target resource, whether a random access signal sent by a client is received;

wherein the first target resource is a random access resource which is associated with a second target resource and meets specified conditions, and the second target resource is any resource unit in a resource set which is pre-allocated to the client by the base station and configured to perform unlicensed data reporting;

re-configure, in response to the random access signal being detected on the first target resource, a new TA for the client according to the random access signal;

return the new TA to the client; and receive target data which is sent by the client through the second target resource based on the new TA, wherein the target data is data which needs to be reported to the base station by the client presently.

* * * * *